Apr. 10, 1923.
O. F. SCHWEDER
1,451,590
RAKE
Filed Mar. 15, 1921   3 sheets-sheet 1
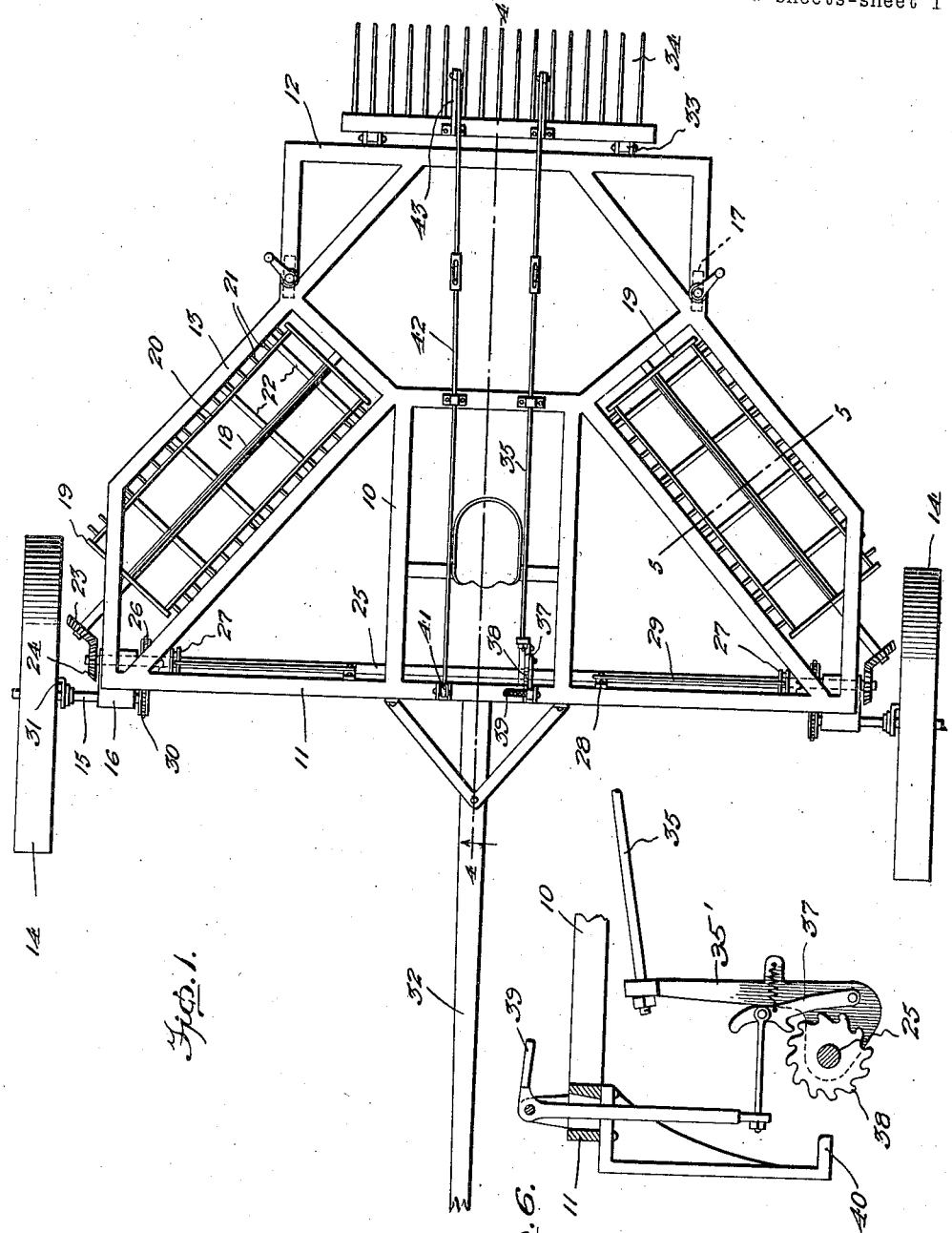
O. F. Schweder
INVENTOR
BY Victor J. Evans
ATTORNEY

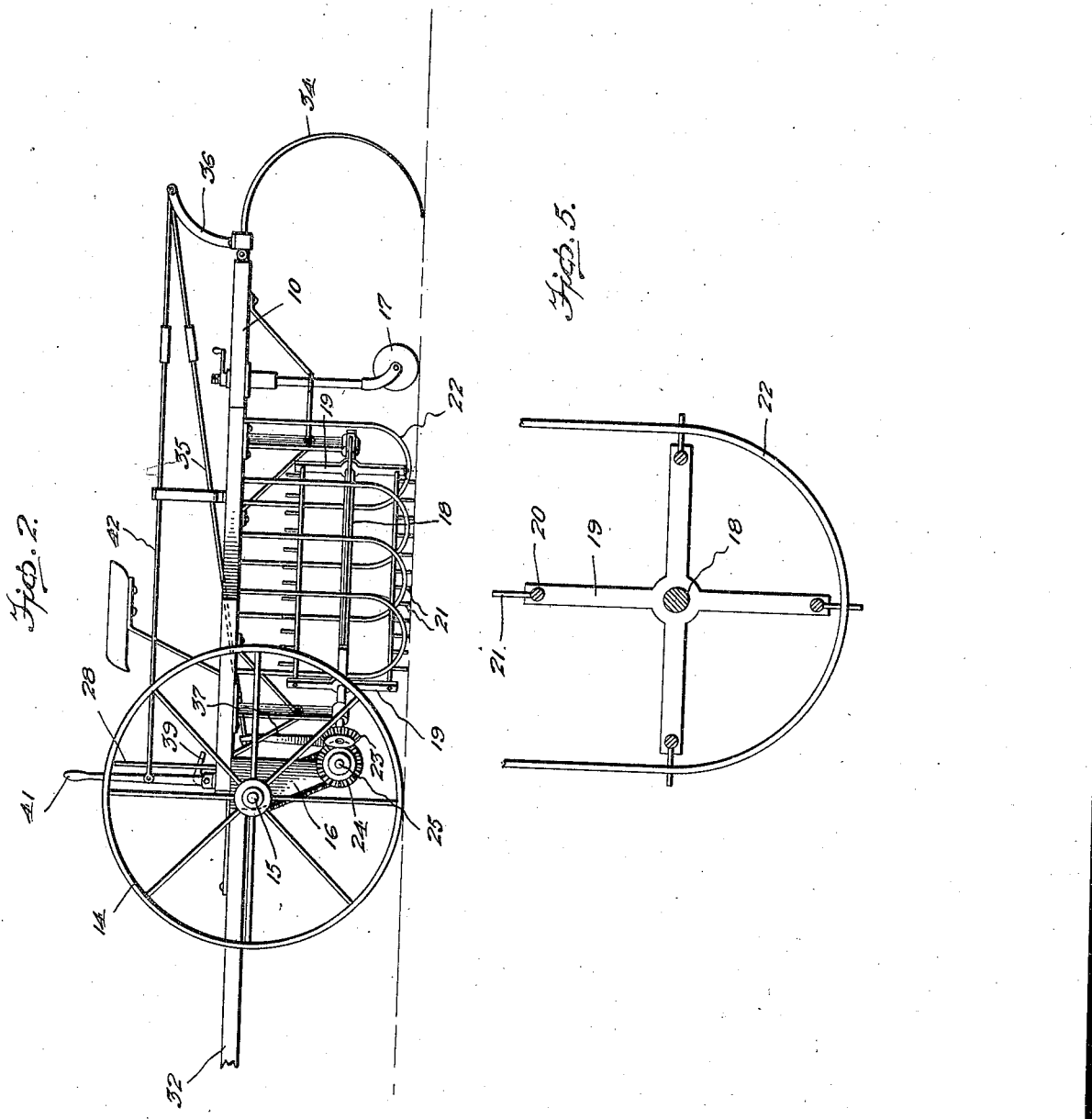

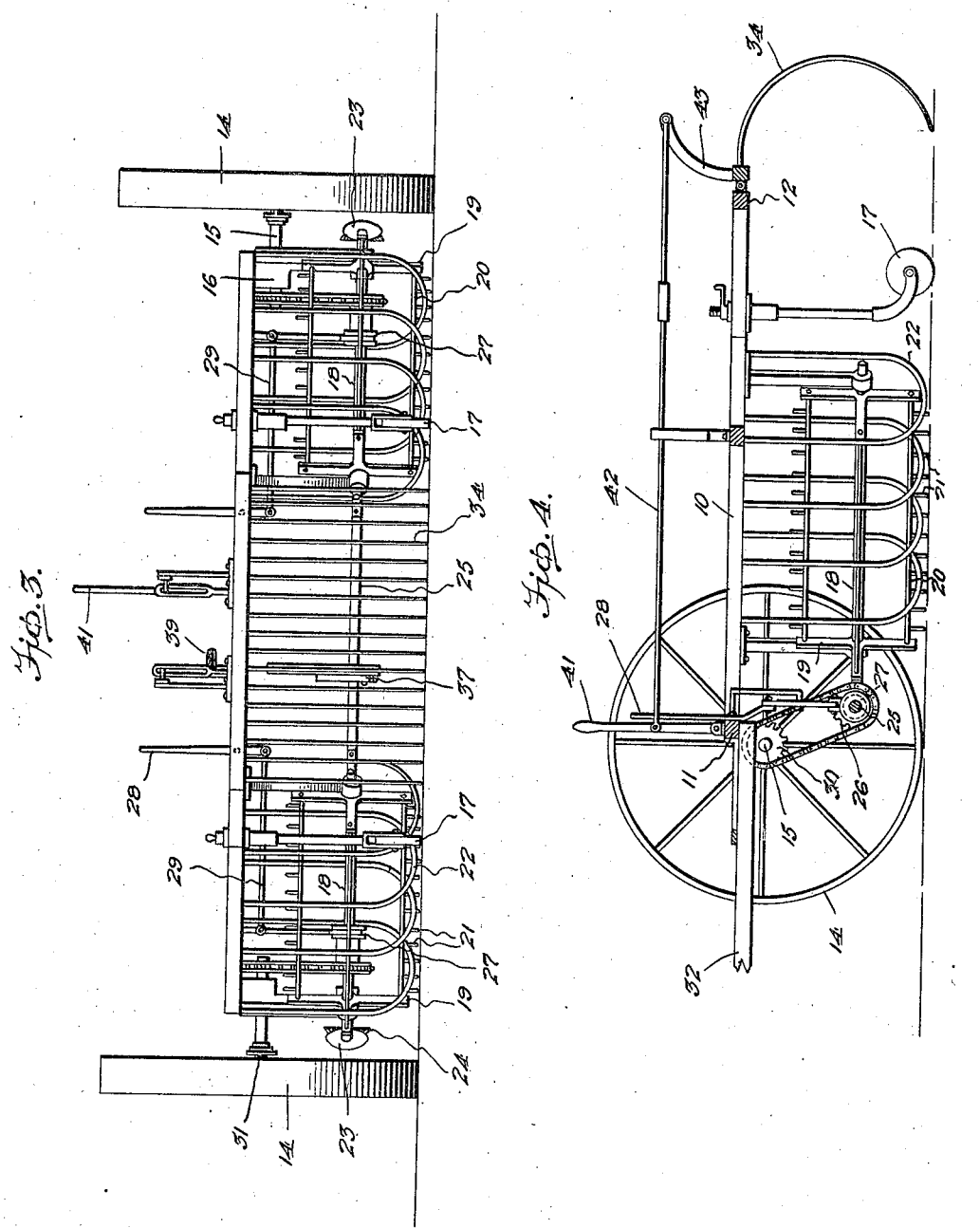

Patented Apr. 10, 1923.

1,451,590

UNITED STATES PATENT OFFICE.

OSCAR F. SCHWEDER, OF BILLINGS, MONTANA.

RAKE.

Application filed March 15, 1921. Serial No. 452,490.

*To all whom it may concern:*

Be it known that I, OSCAR F. SCHWEDER, residing at Billings, in the county of Yellowstone and State of Montana, have invented new and useful Improvements in Rakes, of which the following is a specification.

This invention relates to improvements in agricultural machines and has for an object the provision of a rake which will direct the raked material centrally of the machine from either one or both sides as desired and place the said material in position to be gathered and deposited in windrows.

Another object is the provision of a rake of this character which includes separate rake units arranged upon opposite sides of the machine and operated from the supporting wheels, provision being made whereby either one or both of the rake units may be operated.

Another object is the provision of a rake which may be automatically dumped through the operation of the supporting wheels, means being provided whereby the dumping means may be rendered active at the will of the operator.

With the above and other objects in view, the invention further includes the following novel features and details of construction, to be hereinafter more fully described, illustrated in the accompanying drawings and pointed out in the appended claim.

In the drawings:—

Figure 1 is a plan view of a rake constructed in accordance with the invention.

Figure 2 is a side view of the same.

Figure 3 is a rear elevation.

Figure 4 is a sectional view on the line 4—4 of Figure 1.

Figure 5 is an enlarged section on the line 5—5 of Figure 1 and

Figure 6 is a detail view showing the connection between the main drive shaft and the rake dumping apparatus.

Referring in detail to the drawings, wherein like characters of reference denote corresponding parts, the reference character 10 indicates a frame which includes a forward transverse bar 11 and a rear transverse bar 12, these bars being connected by intermediate bars which includes side frames 13.

The front end of the frame is supported upon wheels 14, the latter being secured upon short axles 15 which are mounted in bearings 16 carried by the front transverse bar 11. The rear end of the frame 10 is supported by castor or crazy wheels 17, which are mounted in suitable bearings provided in the frame and which are capable of adjustment in these bearings so as to regulate the height of the rear end of the frame.

Mounted in bearings carried by each of the side frames 13 are shafts 18, the latter extending inwardly and from the front to the rear of the frame 10. These shafts 18 have secured thereon radially arranged arms 19, which are located adjacent each end of the shafts and which are connected by bars 20. The bars 20 carry spaced rake teeth 21, which are adapted to gather up the material when the shafts 18 are revolved and direct the said material inward toward the center of the machine. The rake teeth 21 are protected by substantially U-shaped guards 22 which are disposed beneath the frames 13 and have their ends connected to the parallel bars which are included in these frames.

The outer ends of each of the shafts 18 have secured thereon a beveled gear 23, which engages a beveled gear 24 mounted upon a main drive shaft 25. Also mounted upon the shaft 25 are pinions 26 which are loose upon the said shaft and which are adapted to be locked thereon through the medium of clutches 27. These clutches are controlled by hand levers 28, which are connected to the clutches through the medium of rods 29. The pinions 26 are driven by the pinions 30 which are secured to the axles 15 by means of chains, while the wheels 14 have a ratchet connection 31 with these axles so that the machine may be backed without effecting the operation of the shafts 18. Extending forwardly from the transverse bar 11 is a tongue 32, which may be connected to a suitable motive power.

Hingedly secured to the rear transverse bar 12 of the frame 10 as indicated at 33, is a rake 34, the said rake being adapted to gather the material thrown inward by the side rakes. The rake 34 is adapted to be raised, that is, moved to a dumping position for the purpose of depositing the gathered material in piled or bunched formation. To accomplish this there is provided a bar or rod 35 which has one end connected to an arm 36 carried by the rake 34 and its opposite end extending forward for connection with a substantially L-shaped arm 35' mounted upon the shaft 25 and carrying a spring actuated dog 37. This dog engages a member 38 carried by the shaft 25 and when so engaged will lock the arm 35' to the shaft so that as the latter is revolved, the rake 34 will be moved to a dumping position. The dog 37 is engaged with the member 38 by means of a foot operated lever 39, a cam 40 serving to disengage the dog 37 and member 38 after the rake has reached a dumping position. In addition, there is provided a hand lever 41 which has a connection 42 with another arm 43 carried by the rake 34, so that the latter may be manually elevated and held in such elevated position as desired. This is especially useful when the rake is being moved from one field to another.

The invention is susceptible of various changes in its form, proportions and minor details of construction and the right is herein reserved to make such changes as properly fall within the scope of the appended claim.

Having described the invention what is claimed is:—

A rake comprising a frame including front and rear transversely arranged parallel bars, traction wheels located adjacent the front transverse bar, rakes carried by the frame at each side thereof, a centrally located rake hingedly secured to the rear transverse bar at the rear of the side rakes, a shaft extending transversely of the frame, a substantially L-shaped arm pivotally mounted upon the shaft, means connecting the arm and hinged rake, a toothed wheel secured upon the shaft, a spring actuated dog pivotally secured to the L-shaped arm and normally disengaged from the toothed wheel and manually operated means connected to the dog, whereby the latter may be engaged with the toothed wheel to pivotally move the L-shaped arm and raise the hinged rake to dumping position.

In testimony whereof I affix my signature.

OSCAR F. SCHWEDER.